(12) United States Patent
Toumura et al.

(10) Patent No.: US 8,149,705 B2
(45) Date of Patent: Apr. 3, 2012

(54) PACKET COMMUNICATIONS UNIT

(75) Inventors: Kunihiko Toumura, Hachioji (JP);
Tomoyuki Iijima, Kawasaki (JP)

(73) Assignee: Alaxala Networks Corporation,
Kanagawa (JP)

( * ) Notice: Subject to any disclaimer, the term of this patent is extended or adjusted under 35 U.S.C. 154(b) by 607 days.

(21) Appl. No.: 11/500,437

(22) Filed: Aug. 8, 2006

(65) Prior Publication Data

US 2007/0160073 A1 Jul. 12, 2007

(30) Foreign Application Priority Data

Jan. 10, 2006 (JP) ................................. 2006-001994

(51) Int. Cl.
*G01R 31/08* (2006.01)
(52) U.S. Cl. ......... 370/232; 370/244; 370/245; 370/253
(58) Field of Classification Search .................. 370/242, 370/250, 252
See application file for complete search history.

(56) References Cited

U.S. PATENT DOCUMENTS

| | | | | |
|---|---|---|---|---|
| 6,128,298 | A * | 10/2000 | Wootton et al. | 370/392 |
| 6,738,355 | B1 * | 5/2004 | Love et al. | 370/252 |
| 6,987,768 | B1 * | 1/2006 | Kojima et al. | 370/401 |
| 7,046,680 | B1 * | 5/2006 | McDysan et al. | 370/396 |
| 2001/0055274 | A1 * | 12/2001 | Hegge et al. | 370/229 |
| 2002/0016856 | A1 * | 2/2002 | Tallegas et al. | 709/238 |
| 2002/0191600 | A1 * | 12/2002 | Shah et al. | 370/389 |
| 2003/0162541 | A1 * | 8/2003 | Schwarzbauer et al. | 455/432 |
| 2005/0063398 | A1 * | 3/2005 | Choudhury et al. | 370/401 |

(Continued)

FOREIGN PATENT DOCUMENTS

JP 2004-248185 2/2003

OTHER PUBLICATIONS

Waldbusser, S. et al, "Remote Network Monitoring Managements Information Base", Network Working Group, Standards Track, May 2000, pp. 1-99.
Phaal, P. et al, "InMon Corporation's sFlow: A Method for Monitoring Traffic in Switched and Routed Networks", Network Working Group, Informational, Sep. 2001, pp. 1-32.

(Continued)

*Primary Examiner* — Nittaya Juntima
*Assistant Examiner* — Andrew Oh
(74) *Attorney, Agent, or Firm* — Stites & Harbison PLLC; Juan Carlos A. Marquez, Esq.

(57) ABSTRACT

To analyze traffic at an application level, a stream according to TCP or SCTP is required to be reconstructed and to be analyzed. When a packet is transferred to analyzing equipment using a port mirroring function with which a router and a switch are provided, transferred traffic volume increases and exceeds the throughput of the analyzing equipment. As only a part of packets configuring a stream is transferred to the analyzing equipment in transfer to the analyzing equipment using a packet sampling function, analysis at the application level is impossible. To solve the problem, when a packet communication unit recognizes a stream start packet, samples a stream initiated by the packet on a condition and at a rate respectively determined beforehand and generates a condition for copying the packet based upon information of both ends of the stream included in the packet, packets sampled in units of stream can be transferred to the analyzing equipment.

11 Claims, 15 Drawing Sheets

U.S. PATENT DOCUMENTS

| | | | |
|---|---|---|---|
| 2005/0094572 A1* | 5/2005 | Mimura et al. | 370/252 |
| 2005/0232262 A1 | 10/2005 | Toumura | |
| 2005/0276230 A1* | 12/2005 | Akahane et al. | 370/252 |
| 2006/0002298 A1 | 1/2006 | Suzuki et al. | |
| 2006/0062203 A1* | 3/2006 | Satapati | 370/352 |
| 2006/0083223 A1 | 4/2006 | Suzuki et al. | |
| 2006/0239203 A1* | 10/2006 | Talpade et al. | 370/252 |
| 2007/0041331 A1* | 2/2007 | Ma et al. | 370/252 |
| 2007/0297349 A1* | 12/2007 | Arkin | 370/255 |

OTHER PUBLICATIONS

Claise, Ed. B, "Cisco Systems NetFlow Services Export Version 9", Network Working Group, Informational, Oct. 2004, pp. 1-34.

"Transmission Control Protocol", DARPA Internet Program Protocol Specification, Informational Sciences Institute University of Southern California, Sep. 1981, pp. 1-180.

Stewart, R. et al, "Stream Control Transmission Protocol", Network Working Group, Standards Track, Oct. 2000, pp. 1-135.

* cited by examiner

FIG. 4

SAMPLING STREAM TABLE 303

| Src IP | Dst IP | Src Port | Dst Port | Proto. | SAMPLING RATE | COPY DESTINATION | counter |
|---|---|---|---|---|---|---|---|
| * | 133.144.79.206 | * | 80 | TCP | 1/1024 | I/F 2 | 0 |
| * | 133.144.20.100 | * | 25 | TCP | 1/65536 | I/F 2 | 1313 |

FIG. 5

STREAM SAMPLING FILTER TABLE 304

| Cli IP | Srv IP | Cli Port | Srv Port | Proto. | COPY DESTINATION | Srv Syn | Cli Syn | Start | Last |
|---|---|---|---|---|---|---|---|---|---|
| 192.168.0.1 | 133.144.79.206 | 3021 | 80 | TCP | I/F 2 | 1 | 1 | 123 | 345 |

PACKET COMMUNICATIONS UNIT

CLAIM OF PRIORITY

The present application claims priority from Japanese application JP 2006-001994 filed on Jan. 10, 2006, the content of which is hereby incorporated by reference into this application.

FIELD OF THE INVENTION

The present invention relates to a packet communications unit that switches a packet according to routing information in a packet communications network, particularly relates to a unit that analyzes traffic in the network.

BACKGROUND OF THE INVENTION

A communications provider is required to analyze traffic in its own network to effectively utilize network resources. For example, amount of network resources to be reserved for specific service can be estimated beforehand by analyzing the distribution of used services of traffic in its own network and equipment investigation can be optimized. Vain traffic in its own network is reduced by detecting and blocking Distributed Denial of Service (DDoS) attack performed via its own network, and a user's device utilizing the network can be protected.

A method of analyzing traffic can be roughly classified into two categories: statistical analysis and content analysis of each packet.

Statistical analysis uses a function for collecting statistical information which a packet communications unit such as a router has. The total of packets received via a certain port of a router is included in collected statistical information. As even relatively simple hardware can collect statistical information, most of routers can collect statistical information. This function is disclosed in a non-patent document 1, Waldbusser S. "Remote Network Monitoring Management Information Base", STD 59, RFC2819, May, 2000. In the statistical analysis, the number of packets and traffic volume can be statistically analyzed; however, the contents of a passing packet cannot be detailedly analyzed.

Then, a method of transferring a part or the whole of a packet passing a router to analyzing equipment and analyzing the contents of the packet in the analyzing equipment is adopted. For example, all packets received via a certain port can be transferred to the analyzing equipment using a function of a port mirroring with the many routers are provided. Besides, a packet is sampled and can be also transferred to the analyzing equipment using each function of sFlow (disclosed in a non-patent document 2, Phaal P. and others "InMon Corporation's sflow: A Method for Monitoring Traffic in Switched and Routed Networks", RFC3176, September, 2001) and NetFlow (disclosed in a non-patent document 3, "Cisco Systems NetFlow Services Export Version 9" edited by Claise B., RFC3954, August, 2004), which a part of routers have.

A patent document 1, JP-A No. 248185/2004, discloses a method of transferring traffic matched with a condition to analyzing equipment and analyzing it there when suspicious traffic of Distributed Denial of Service attack is detected.

The above-mentioned analyzing methods respectively have problems.

In the method of using port mirroring or in the patent document 1, all packets matched with the condition are transmitted to the analyzing equipment. That is, when suspicious traffic of DDoS attack is detected, a great number of packets are required to be checked and may exceed analyzing capacity in the analyzing equipment. Besides, it is also conceivable that a line between the analyzing equipment and the router is saturated.

In addition, in the methods using sFlow and NetFlow, transfer according to the throughput of the analyzing equipment and the line is enabled by sampling a packet. However, in random sampling in units of packet, a stream that consists of a plurality of continuous packets cannot be reconstructed and the analysis of the stream is difficult.

Many applications use a stream-oriented protocol such as TCP and SCTP as information exchange means between applications. In the stream-oriented protocol, data expressed in a byte string is split into a plurality of packets and is exchanged between a client and a server. When data is transmitted between the client and the server using the stream-oriented protocol, packets are exchanged to establish session between the client and the server. For example, when a SYN packet is transmitted from the client to the server using TCP, the server responds a SYN+ACK packet in response to the SYN packet. When the client transmits an ACK packet in response to the SYN+ACK packet from the server, a session is established. When the session is shut down, an FIN packet and an ACK packet are similarly exchanged. In the invention, a series of packet group till session establishment, data exchange and session shutdown is defined as a stream. The details of TCP are described in a non-patent document 4, Postel J. B. "Transmission Control Protocol", RFC793, September, 1981 and the details of SCTP are described in a non-patent document 5, Stewart R. and others "Stream Control Transmission Protocol", RFC2960, August, 2000.

As described above, in the stream-oriented protocol, data is split into a plurality of packets and is transmitted. Therefore, even if some of packets in a stream are sampled, the stream cannot be reconstructed and analysis equipuments cannot analyse precisely, such as behavior of an application.

SUMMARY OF THE INVENTION

It is an object of the invention to enable the detailed analysis of traffic, reducing traffic to be analyzed when the volume of traffic to be analyzed exceeds the throughput of packet analyzing equipment located in a network.

The invention uses a packet communications unit characterized in that the packet communications unit has a function for sampling in units of stream as means for achieving the object to sample without lacking information as a stream.

To realize it, the packet communications unit according to the invention has means for recognizing whether a packet received via a network interface is a stream start packet or not, the means samples a stream initiated by the packet on a condition and at a rate respectively determined beforehand and generates a condition for copying the packet based upon the information of both ends of the stream included in the packet. Hereby, the packet sampled in units of stream can be transferred to the analyzing equipment.

According to the packet communications unit of the invention, the object to enable analyzing at a level of an application is achieved by suitably regulating a sampling frequency, reducing traffic to be analyzed when the traffic to be analyzed exceeds the throughput of the analyzing equipment.

According to an embodiment of the invention, traffic to be processed can be increased or reduced according to the throughput of the packet analyzing equipment in analyzing a great deal of traffic in units of stream. The invention enables the analysis at an application layer of a great deal of traffic, which was heretofore difficult. According to the invention, each precision of attack analysis and the analysis of a band-limited application can be enhanced in analyzing traffic on a carrier/ISP network, and capital investment for managing the network and the managing cost can be reduced.

In addition, an embodiment of the invention enables application level packet analysis, avoiding an overload state caused by the inflow of packet that exceeding the capacity of the analyzing equipment. This is because the embodiment of the invention controls the volume of the traffic that is transmitted to the analyzing equipment, independent of the volume of whole traffic.

BRIEF DESCRIPTION OF THE DRAWINGS

FIG. 4 shows an example of a sampling stream table;

FIG. 5 shows an example of a stream sampling filter table;

DETAILED DESCRIPTION OF THE PREFERRED EMBODIMENTS

First Embodiment

In this embodiment, the configuration of a unit where a function for sampling in units of stream is built in a router will be described.

Figure 1:
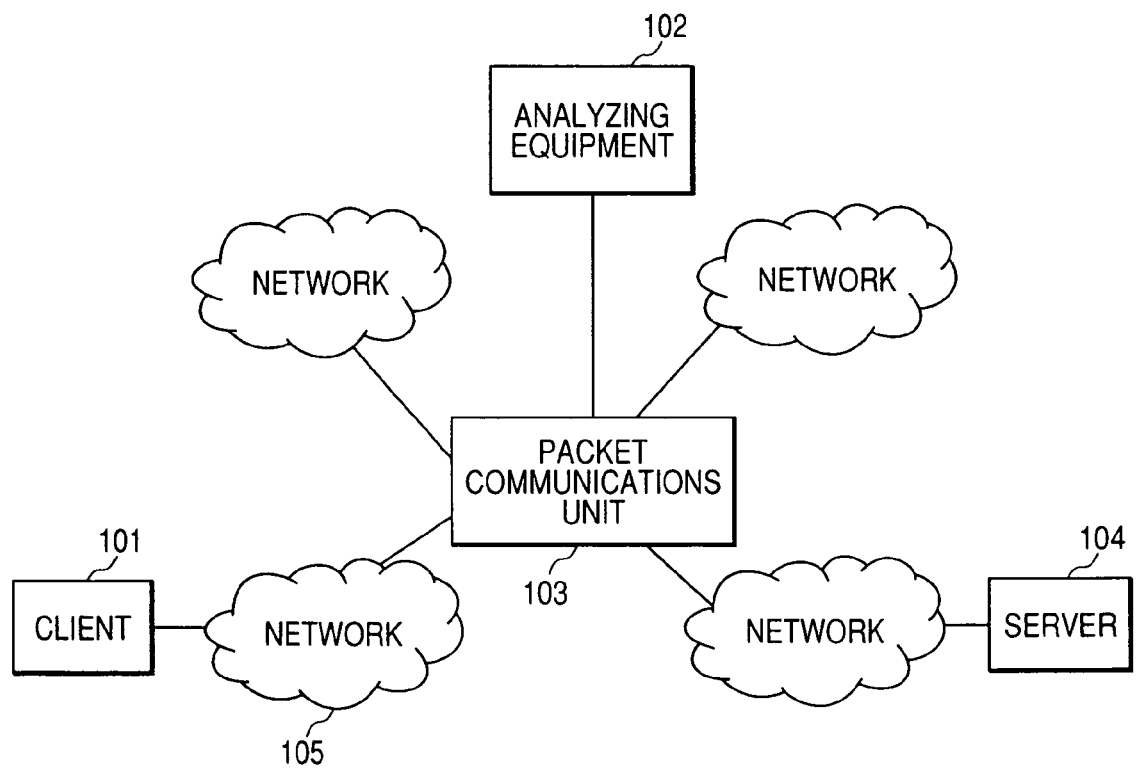
FIG. 1 is a network diagram showing a traffic analyzing system depending upon a packet communications unit having a stream sampling function.

It is supposed that a packet communications unit to which the invention is applied is located in a network shown in FIG. 1 for example. Networks 105 and analyzing equipment 102 are connected to a packet communications unit 103 and the packet communications unit 103 relays a packet exchanged between the networks 105. A client 101 and a server 104 are connected via the networks 105 and the packet communications unit 103. Suppose that the client 101 and the server 104 communicate with each other using TCP. The packet communications unit 103 relays a packet exchanged between the client 101 and the server 104, samples a stream matched with a condition, and transmits it to the analyzing equipment 102. The analyzing equipment 102 reconstructs the stream based upon the packet received from the packet communications unit 103 and analyzes traffic at an application level by analyzing its contents.

Figure 2:
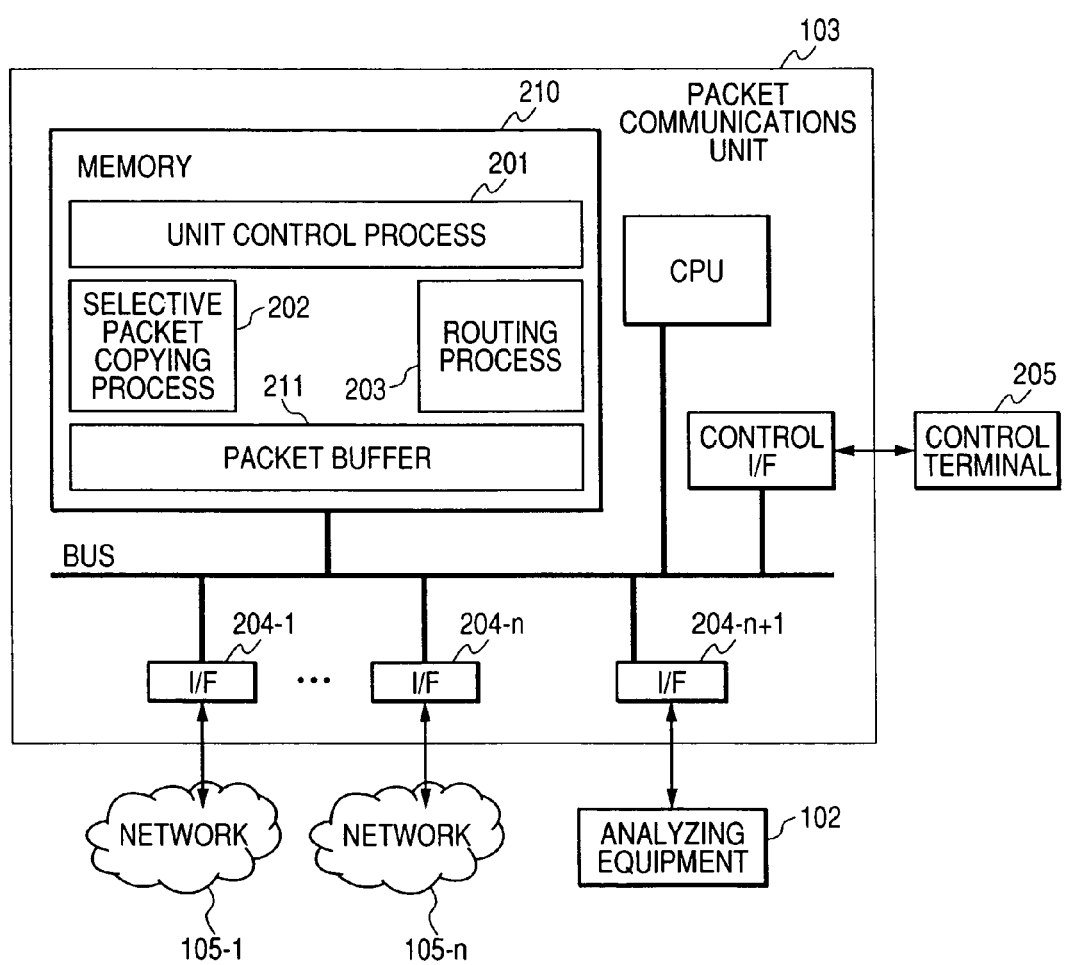
FIG. 2 is an internal block diagram showing the packet communications unit.

FIG. 2 shows internal configuration of the packet communications unit 103. The packet communications unit 103 is connected to the external network 105 or the analyzing equipment 102 via a network interface 204. The network interface 204, a memory 210 and CPU are connected via a bus. In the memory, respective programs and respective data for a unit control process 201, a selective packet copying process 202 and a routing process 203 are stored. In addition, in the memory 210, a packet buffer for storing packets exists. In a field of the selective packet copying process 202, a program for receiving a packet received via the network interface 204 and copying in units of stream and data are stored. The routing process 203 is applied to the copied packet. In the routing process 203, any of the network interface 204 is determined based upon an address of the packet and the packet is transmitted to the suitable address.

A field of the unit control process 201 includes setting and information for the whole packet communications unit. Besides, the field of the unit control process 201 is connected to a control terminal 205 outside the packet communications unit 103 via the bus and a control interface and functions as an interface for control over the unit from an external device.

Figure 3:
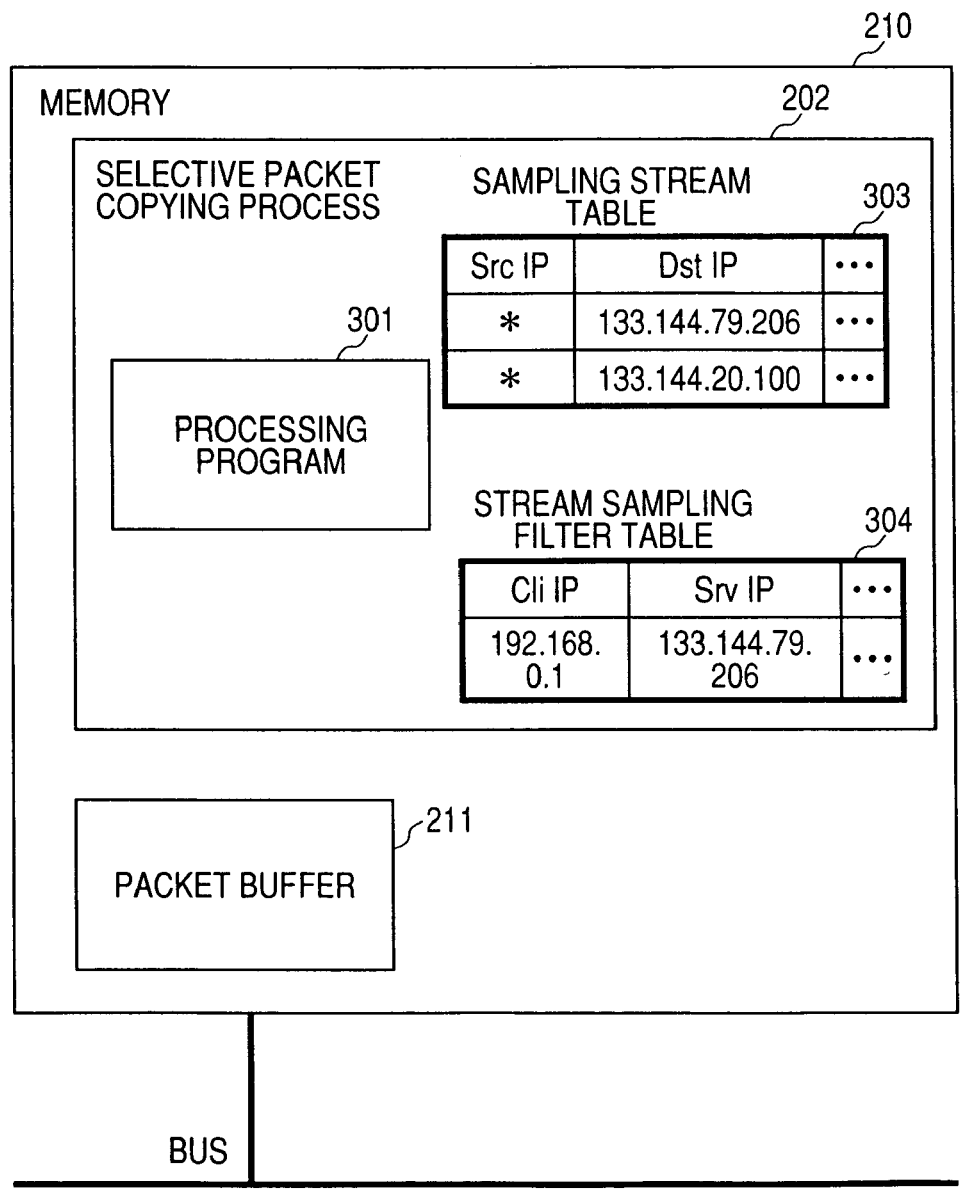
FIG. 3 is a block diagram showing a selective packet copying process.

FIG. 3 is a detail drawing showing a part related to the selective packet copying process 202 in the memory 210. The field of the selective packet copying process 202 includes a processing program 301, a sampling stream table 303 and a stream sampling filter table 304. The packet buffer 211 stores a packet when the packet is exchanged with the network interface 204 and the routing process 203. In a field of the processing program 301, a program for copying a packet stored in the packet buffer 302 according to the sampling stream table 303 and the stream sampling filter table 304 and sending the packet to a field of the routing process 203 is stored.

FIG. 4 shows one example of the sampling stream table 303. This example includes sampling rules based on a source IP address, a destination IP address, a source port number, a destination port number and a protocol class of a packet received by the packet communications unit 103. For example, a receiving network interface number and a layer 2 address can be also included. An asterisk (*) in the table 303 denotes a direction that the corresponding item should be ignored. For the other items, a sampling rate of the corresponding sampling target and a value of a counter showing received frequencies of TCP SYN packets matched with the corresponding condition are included. To sample a stream, an entry is added to the sampling stream table 303 via the unit control process 201. When the entry is added, the entry is prepared based upon target stream information input from the control terminal 205 (its source IP address, its destination IP address, its source port number, its destination port number and its protocol), a copy destination interface identifier and a sampling rate and a value of the counter, and the value of the counter is initialized to zero.

FIG. 5 shows one example of the stream sampling filter table 304. The stream sampling filter table 304 identifies a stream to be copied. The table includes each entry of a client IP address, a server IP address, a client port number, a server port number and a protocol class and at least one of these entries is used to identify a stream. In addition, an identifier of the network interface 204 in a destination of a copy is included and specifies the network interface of the destination to which the copy of the corresponding stream is output.

In the stream sampling filter table, to utilize for a process for deleting an entry in which copying is finished from the stream sampling filter table 304, it includes a flag whether a TCP SYN+ACK packet from the server is received or not, a flag whether a TCP SYN packet from the client is received or not, time when the entry is prepared and recent matching time of the entry.

Figure 6:
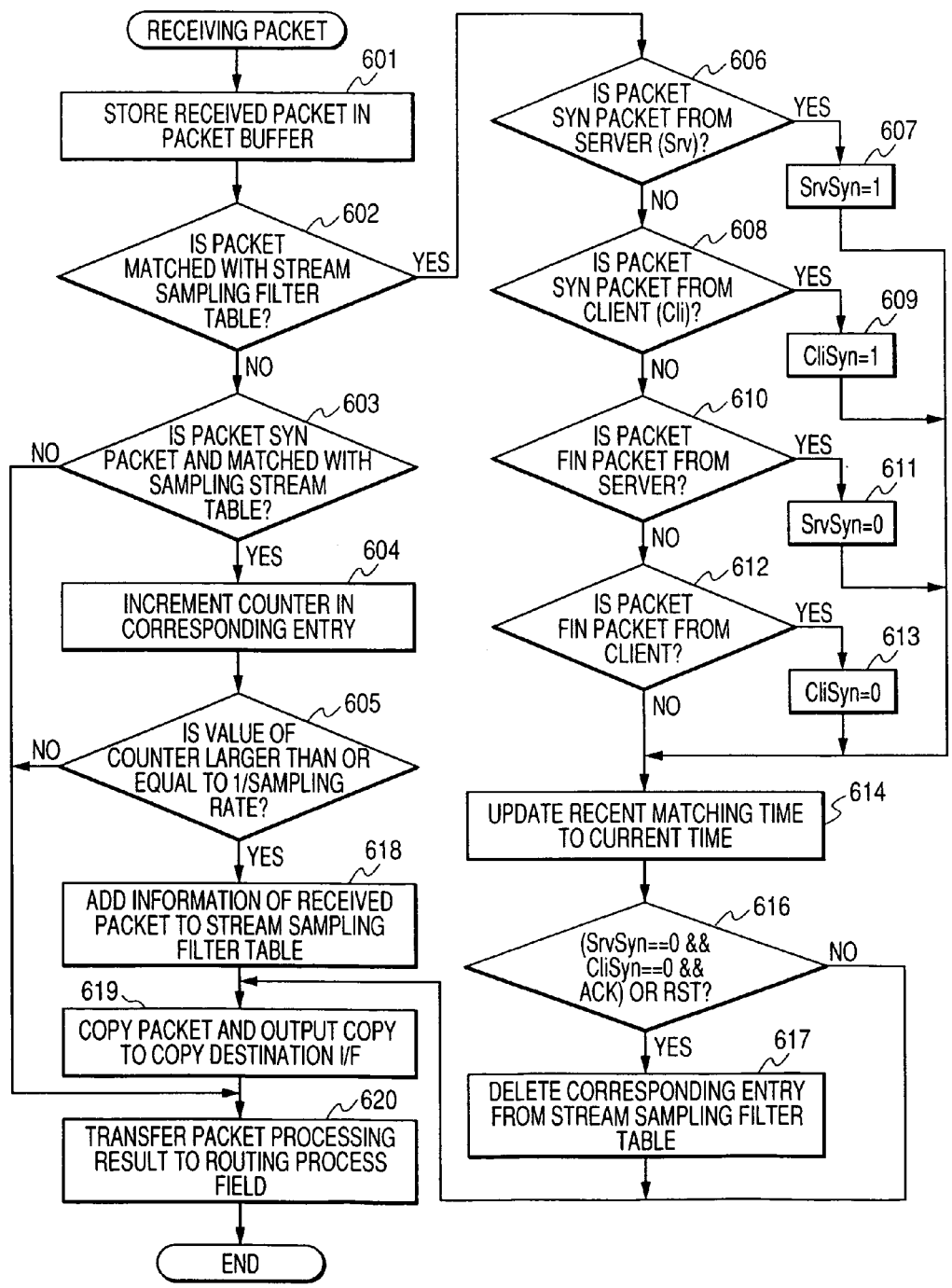
FIG. 6 is a flowchart showing the selective packet copying process when the packet communications unit receives a packet.

FIG. 6 is a flowchart of the selective packet copying process 202 when the packet communications unit 103 receives a packet. The packet received via the network interface 204 is stored in the packet buffer 211 in the memory 210 (a step 601). The processing program 301 retrieves an entry matched with the stored packet in the stream sampling filter table (a step 602). When it is judged that a certain entry is matched with the stored packet, the corresponding packet is judged one of packets forming a stream being currently copied and processing proceeds to a step 606. Steps 606 to 615 are executed based upon a flag in the packet. A series of steps are executed to detect the termination of the TCP stream and stop the copying process. When it is determined in the step 606 that the corresponding packet is a TCP SYN packet from the server, an SrvSyn flag in the matched entry is turned to '1' (the step 607). When it is determined in the step 608 that the corresponding packet is a TCP SYN packet from the client, a CliSyn flag in the matched entry is turned to '1' (the step 609). When it is determined in the step 610 that the corresponding packet is a TCP FIN packet from the server, an SrvSyn flag in the matched entry is turned to '0' (the step 611). When it is determined in the step 612 that the corresponding packet is a TCP FIN packet from the client, a CliSyn flag in the matched entry is turned to '0' (the step 613). In the step 614, recent matching time in the matched entry is updated to current time. When flags SrvSyn and CliSyn are both '0' in the corresponding entry and an ACK flag in the received packet is '1' or an RST flag in the received packet is '1' in a step 616, it is determined that the TCP stream is finished, and the corresponding entry is deleted from the stream sampling filter table (a step 617). An identifier of a network interface which is a destination of a copy included in the matched entry is extracted and the copy of the received packet is output to the network interface (a step 619). Finally, the result of packet processing is transferred to a field of the routing process 203 (a step 620) and the processing is finished.

Next, this section describes process of a flow when no entry matched with the stream sampling filter table 304 exists in the step 602. In a step 603, selective packet copy process checks the packet whether the received packet is a TCP SYN packet and a matched entry exists in the sampling stream table 303 or not. When the received packet is not a TCP SYN packet or when no matched entry exists, it is regarded that the packet is not sampling target, the packet is transferred to a field of the routing process 203, and the processing is finished. When the received packet is a TCP SYN packet and a matched entry exists in the step 603, it is regarded that the packet is a sampling target. Then, in a step 604, a counter included in the matched entry is incremented by 1. Next, to check whether the packet is a first packet of a stream to be copied or not, a value of the counter in the matched entry and a sampling rate are compared (a step 605). When the value of the counter is larger than or equal to an inverse number of the sampling rate, it is judged that the received packet is the first packet of the stream to be copied and the information of the received packet is added to the stream sampling filter table 304 (a step 618). Specifically, a source IP address of the received packet is written to an item of a client IP address in the entry, a destination IP address of the received packet is written to an item of a server IP address in the entry, a source port number of the received packet is written to an item of a client port number in the entry, a destination port number of the received packet is written to an item of a server port number in the entry, and a protocol class (TCP) of the received packet is written to an item of a protocol class in the entry. Besides, the network interface information of a destination of a copy included in the matched entry is written to an item of a copy destination network interface in an entry to be newly prepared in the stream sampling filter table 304. A CliSyn flag showing that a TCP SYN packet from the client is received is turned to '1', an SrvSyn flag showing that a TCP SYN packet from the server is received is turned to '0', and time when the entry is prepared and time when the packet is received as recent matching time are written. The copied packet is output to the copy destination network interface (the step 619), the result of packet processing is transferred to a field of the routing process 203 (the step 620), and the processing is finished.

Figure 7:
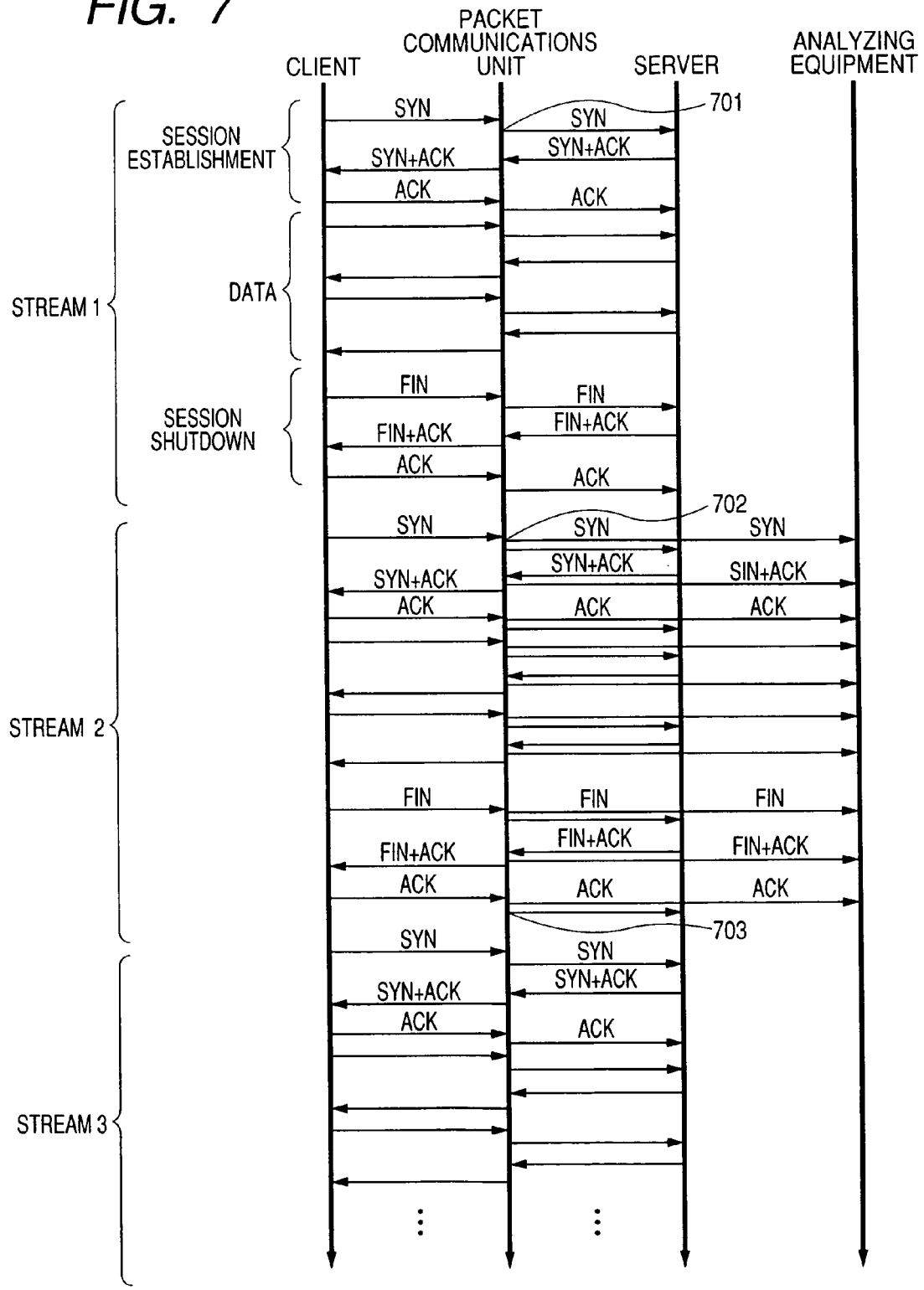
FIG. 7 shows an example of a sequence when TCP is used.

In the above-mentioned process, it is identified whether a packet passing the packet communications unit 103 is a sampling stream or not and a copied stream can be sent to the external analyzing equipment at a specified rate. FIG. 7 shows an example of a sequence in this embodiment. In the example, three streams are established between the client 101 and the server 104 and the second stream is copied. When the packet communications unit 103 receives a TCP SYN packet which is a first packet of the first stream (701), the above-mentioned processing is executed in the selective packet copying process, a counter in a matched entry in the sampling stream table is incremented by 1, the packet is output via the network interface selected in the routing process, and is transferred to the server. Next, the packet communications unit receives a TCP SYN packet at the head of the second stream (702) and recognizes that the packet is a first packet of a stream to be copied. At this time, making a copy of the packet to be sent to the analyzing equipment is started. When the packet communications unit receives a TCP ACK packet (703) after a TCP FIN packet from the client 101 or the server 104 is received and values in SrvSyn and CliSyn in the stream sampling filter table are turned to '0', the matched entry is deleted from the stream sampling filter table and the copying process is finished.

Next, this section describes a method of deleting an entry in the stream sampling filter table 304. As the number of entries in the stream sampling filter table 304 is limited, a new entry is required to be added after any of the entries is deleted according to any criterion when the number of streams to be copied exceeds the number of entries. To implement this, time when an entry is prepared in the sampling stream table and recent matching time are stored.

When the number of entries in the stream sampling filter table 304 exceeds a defined value, an entry to be deleted is determined according to the following two methods.

First, a method of deleting the oldest entry can be given as a first method. According to this method, an entry having the oldest preparation time in all entries of the stream sampling filter table is deleted.

Second, a method of deleting the most unused entry can be given as a second method. According to this method, an entry having the oldest recent matching time in all the entries of the stream sampling filter table is deleted.

The number of entries can be prevented from being infinitely increased by utilizing these two methods.

In the above-mentioned embodiment, it is premised that TCP is used for a protocol of a stream. Next, an embodiment when SCTP is used for a protocol of a stream will be described.

Figure 8:
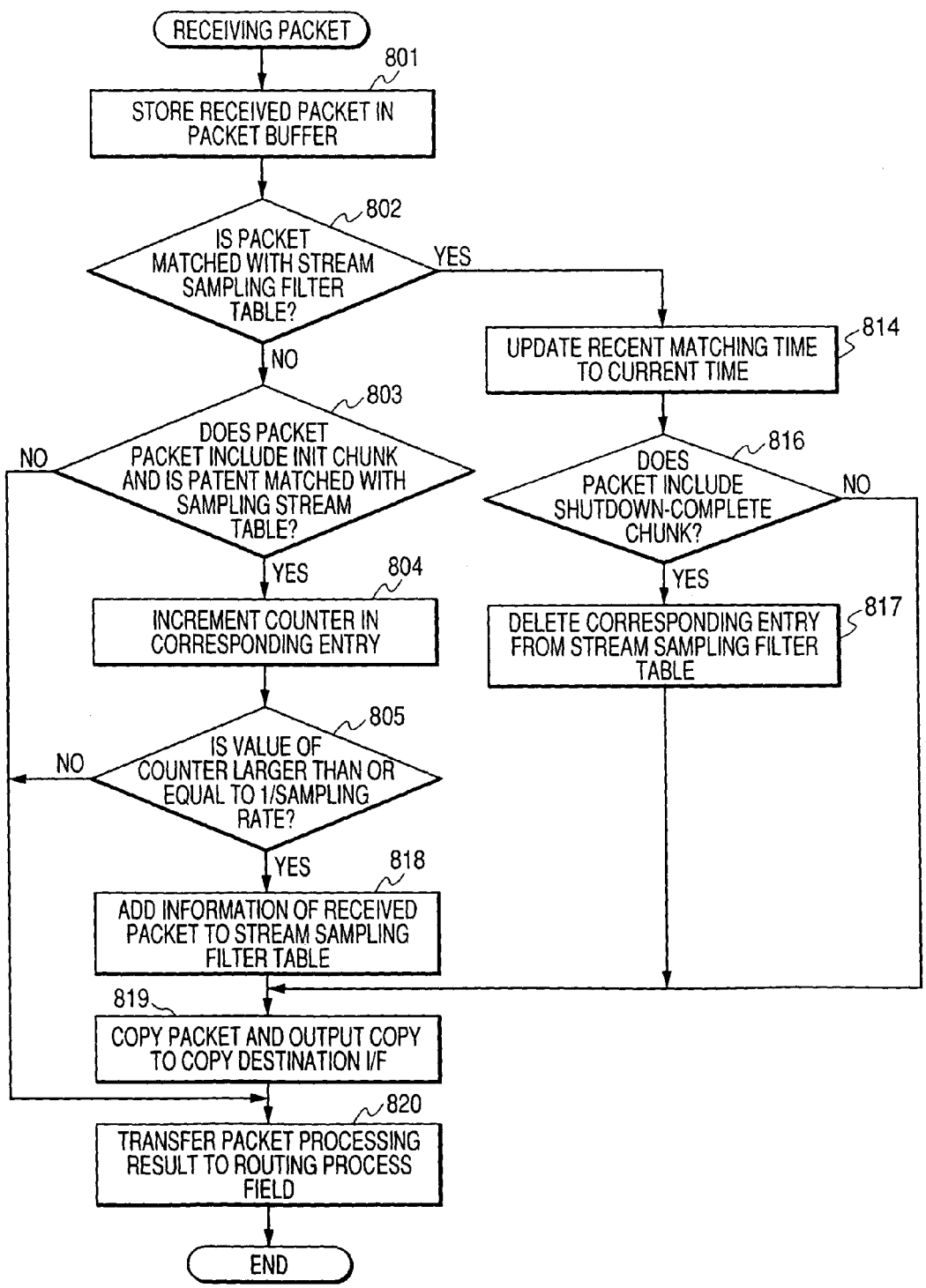
FIG. 8 is a flowchart when SCTP is used.

FIG. 8 shows a flow when SCTP is utilized. SCTP is different from TCP first in that the detection of the initiation of a stream depends upon checking the existence of an INIT chunk and second in that there is no step for checking an SYN flag and an FIN flag after a step 802. This reason is that in SCTP, a stream is initiated with a packet including an INIT chunk and is finished with a packet including a SHUT-DOWN-COMPLETE chunk.

Figure 9:
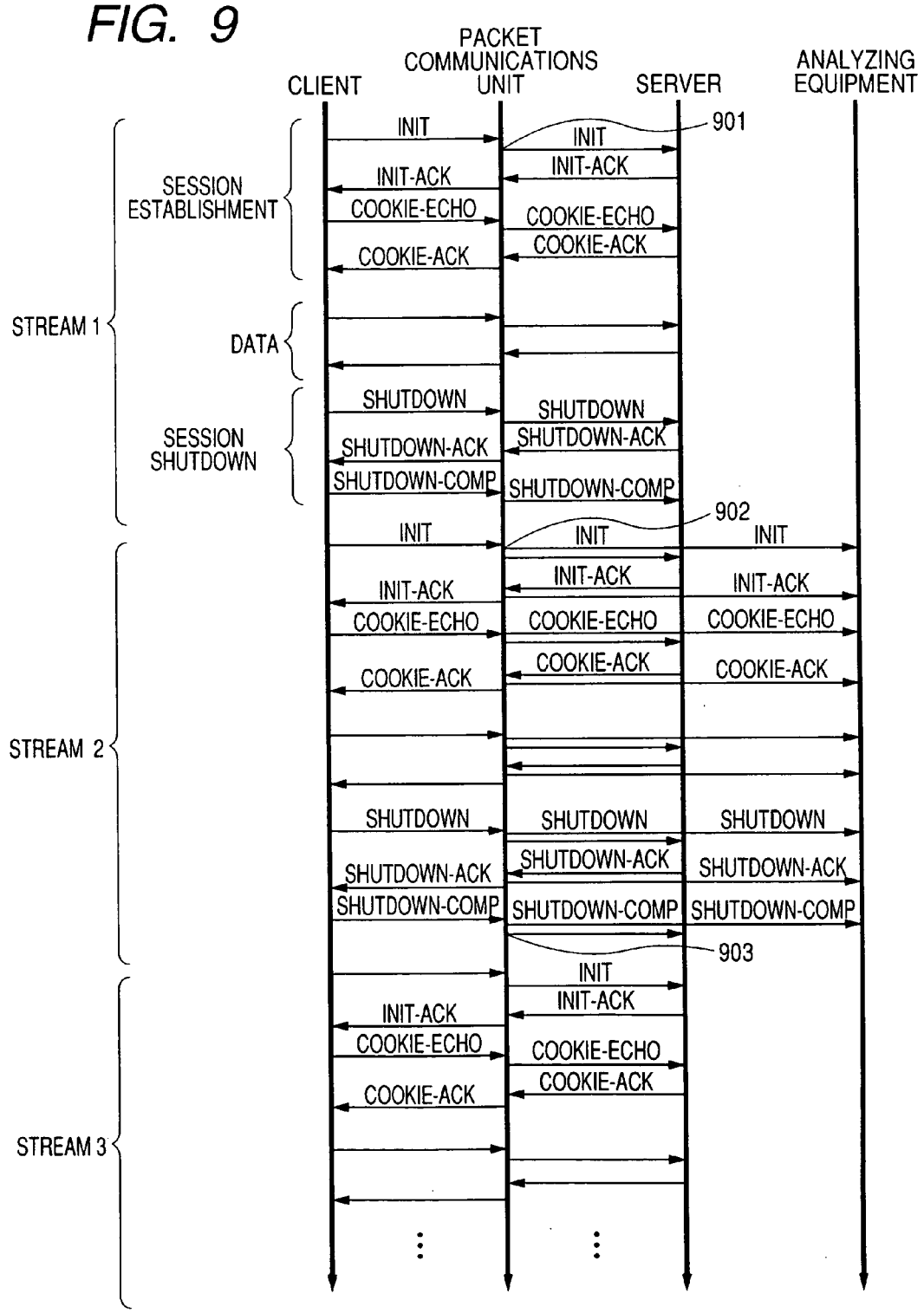
FIG. 9 shows an example of a sequence when SCTP is used.

FIG. 9 shows an example of a sequence when SCTP is utilized. The packet communications unit 103 recognizes the initiation of a stream by a packet including an INIT chunk from the client 101 (901). When the next stream 2 is determined as a stream to be copied, copying a packet is started in 902. As for the termination of the stream, only the transmission of SHUTDOWN-COMPLETE has only to be checked in SCTP (903).

This embodiment can be also applied to SCTP according to the procedures described in relation to FIGS. 8 and 9.

Second Embodiment

In the first embodiment, it is assumed that a stream to be sampled is input to the packet communications unit 103 from the external control terminal. In the meantime, in this embodiment, a method of automatically configuring a sampling stream table by operation in linkage with another analyzing equipment will be described.

As large computing resources are generally required to reconstruct a stream and analyze it, the throughput of processing is lower, compared with analysis depending upon statistical analysis/packet sampling. Therefore, analysis depending upon the reconstruction of a stream in a carrier/an ISP network was difficult. Then, in this embodiment, a method of combining two methods of statistical analysis and stream analysis, analyzing all traffic by high-speed statistical analysis, extracting only traffic which seems to require stream analysis and sending a copy by stream sampling to equipment that executes stream analysis will be described.

Figure 10:
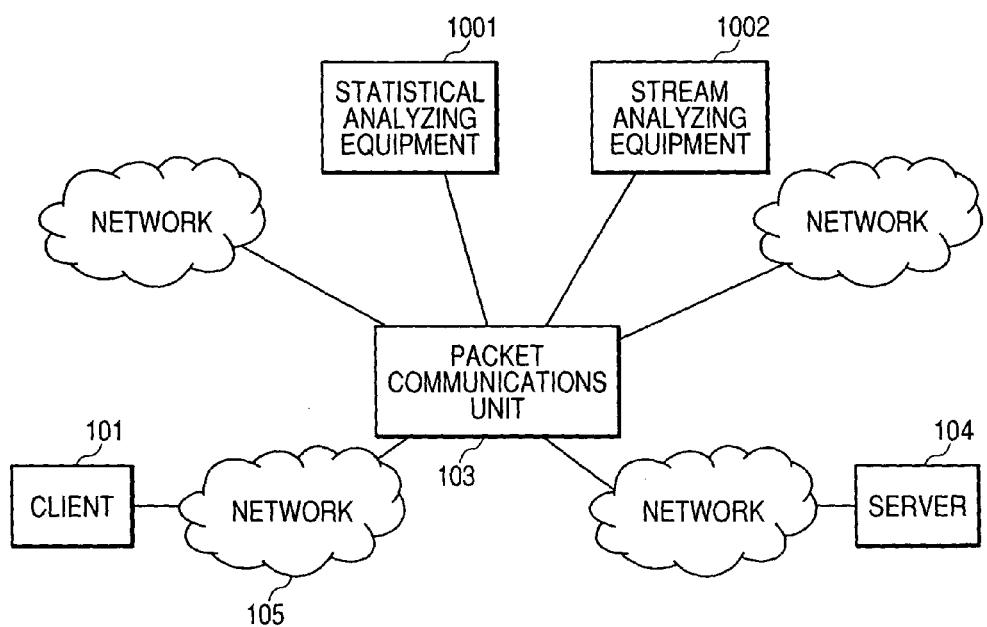
FIG. 10 is a network diagram showing a traffic analyzing system in which statistical analyzing equipment and stream analyzing equipment are combined.

In this embodiment, to detect that malicious traffic flows between a client 101 and a server 104, whole analysis is performed using statistical information/a packet sample represented by sFlow/NetFlow, only a suspicious stream is copied by stream sampling, and is sent to stream analyzing equipment. FIG. 10 is a network diagram supposed in this embodiment. Statistical analyzing equipment 1001 and stream analyzing equipment 1002 are connected to a packet communications unit 103.

Figure 11:
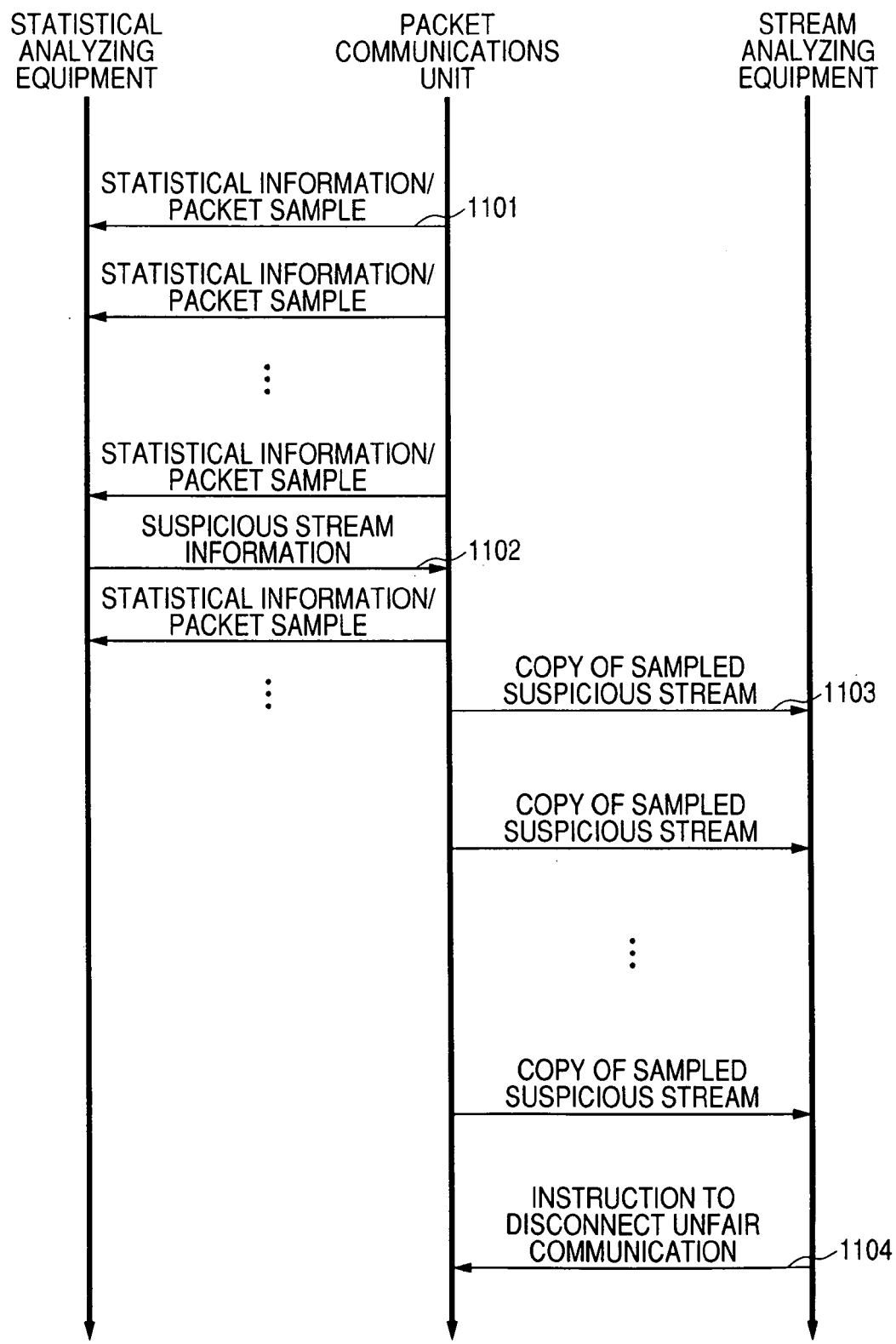
FIG. 11 shows an example of a sequence.

FIG. 11 shows an example of a sequence in this embodiment. The packet communications unit 103 transmits the statistical information of packets transmitted/received by the packet communications unit 103 and samples of the packets to the statistical analyzing equipment 1001 using sFlow/Net-Flow (1101). The statistical analyzing equipment narrows down an IP address and a port number of equipment which seems to maliciously communicate based upon the received statistical information and the received packet samples. The statistical analyzing equipment transmits the information of a stream to be sampled to the packet communications unit 103 based upon the above-mentioned information (1102). Specifically, the statistical analyzing equipment estimates at least one of a source IP address, a destination IP address, a source port number, a destination port number and a protocol class based upon the statistical information/the packet samples and transmits at least one to the packet communications unit 103 together with an identifier of a network interface to which the stream analyzing equipment 1002 is connected (1103). Hereby, a suspicious stream is sampled, is copied, and a copy is transmitted to the stream analyzing equipment 1002. The stream analyzing equipment performs analysis using the received suspicious stream and determines whether the suspicious stream is unfair communication or not. When the stream analyzing equipment 1002 determines that the suspicious stream is malicious communication, it transmits an instruction to disconnect malicious communication to the packet communications unit 103 (1104). Hereby, the malicious communication is dropped by the packet communications unit 103.

According to this method, malicious traffic can be precisely found and dropped by the analysis of minimum streams, analyzing the passing whole packets.

Third Embodiment

In the first and second embodiments, we described the examples that the stream sampling function is built in the router. This embodiment describes a method of building a stream sampling function in the existing router by realizing the stream sampling function in a filter-type packet communications unit.

Figure 12:
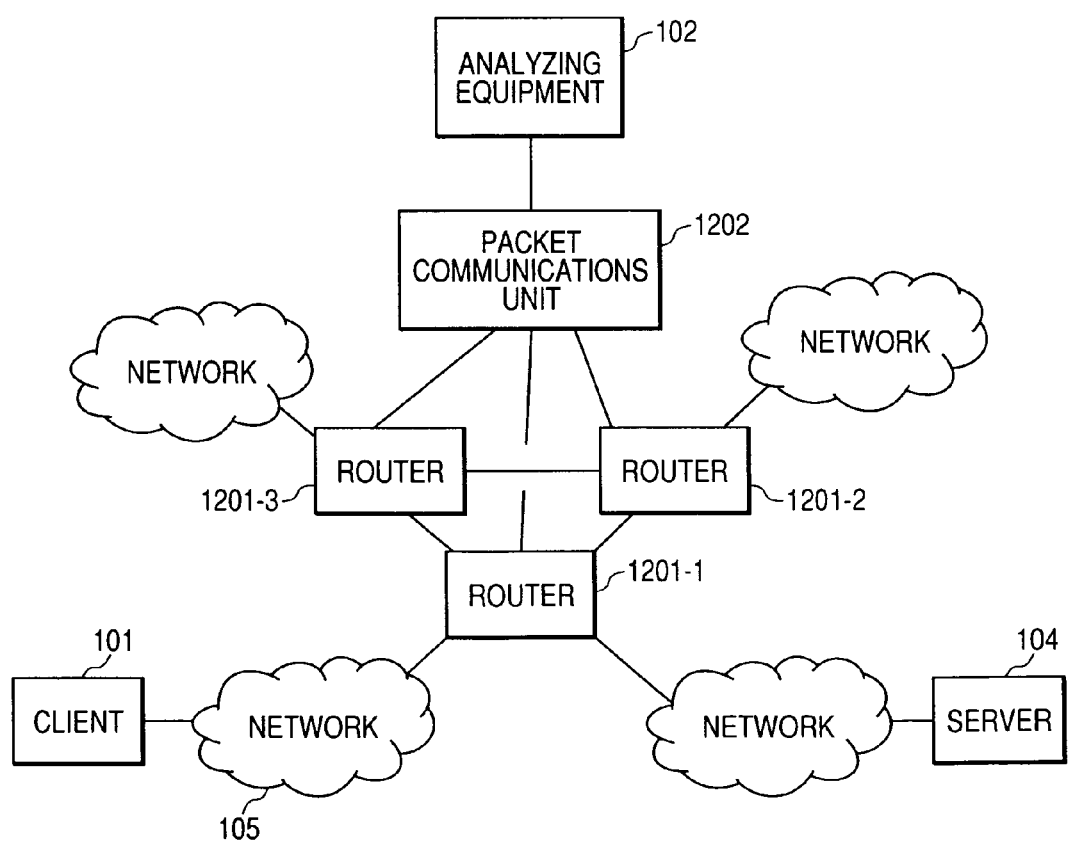
FIG. 12 is a network diagram when a stream sampling function is implemented by a filter-type packet communications unit.

FIG. 12 is a network diagram supposed in this embodiment. A network system is formed by networks 105 and routers 1201 and in the network system, a plurality of routers 1201 and a packet communications unit 1202 are connected. Besides, analyzing equipment 102 is connected to the packet communications unit 1202.

The router 1201 copies traffic to be analyzed using a port mirroring function which is a standard router function and transmits a copy to the packet communications unit 1202. The port mirroring function means a function for outputting a copy of a packet received or transmitted via a network interface of the router to a specified network. The packet communications unit 1202 can receive a packet output from each router 1201 by connecting the packet communications unit 1202 to the network interface specified as a destination of port mirroring in each router 1201. It is supposed that the packet communications unit 1202 is utilized by one or more routers in common. This system was devised to reduce a cost for realizing a stream sampling function by sharing the packet communications unit 1202 with multiple equipment.

Figure 13:
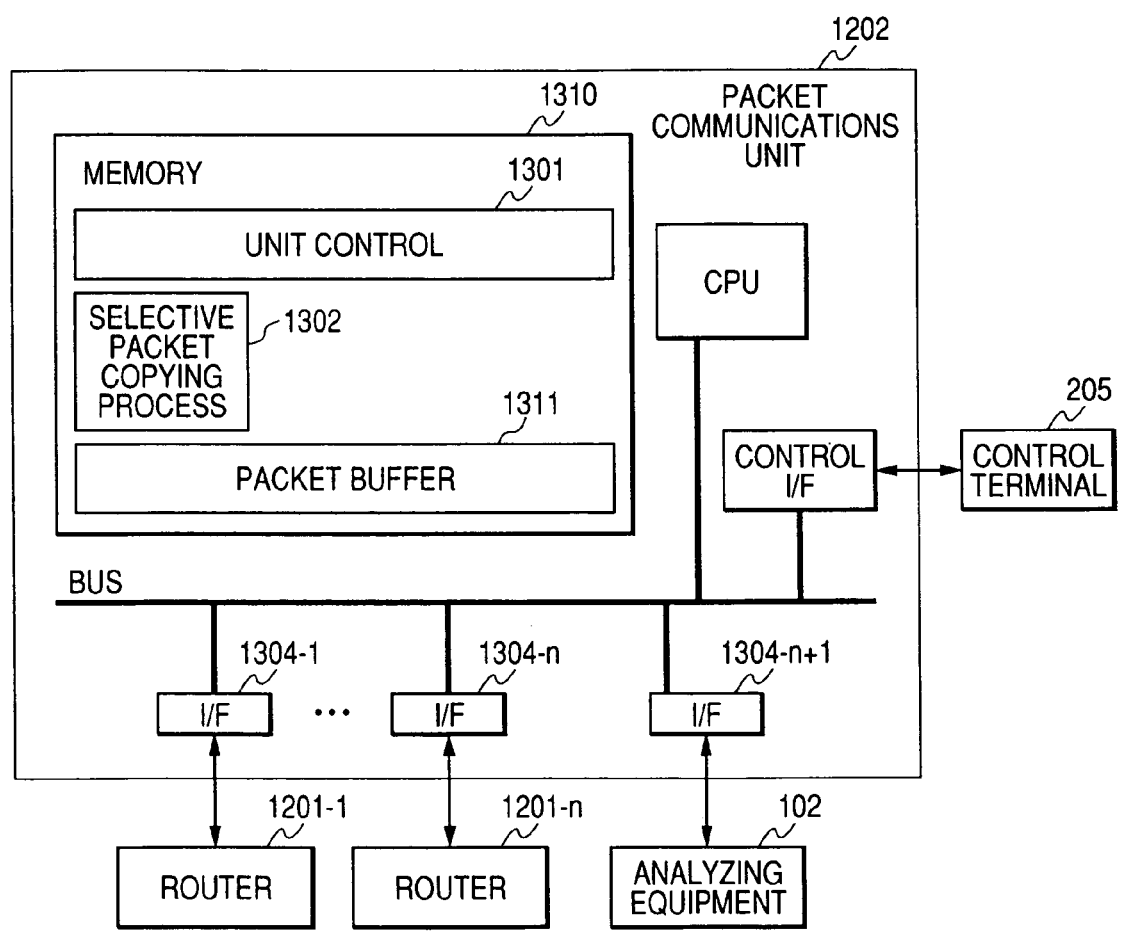
FIG. 13 is a block diagram showing a packet communications unit in which a filter-type stream sampling function is implemented.

FIG. 13 is a block diagram showing the filter-type packet communications unit realizing the stream sampling function. The packet communications unit 1202 has network interfaces 1304-1 to 1304-$n$ connected to a plurality of routers and a network interface 1304-$n$+1 connected to the analyzing equipment. The network interface 1304, a memory 1310 and CPU are connected via a bus. In the memory, respective programs and respective data for a unit control process 1301 and a selective packet copying process are stored. In addition, in the memory 1310, a packet buffer for storing packets exists. In a field of the selective packet copying process 1302, the program for extracting a packet to be sampled based upon data copied in the router 1201 and transmitting the packet from the network interface 1304-$n$+1 connected to the analyzing equipment and the data are stored. In a field of the unit control 1301, the program for setting the selective packet copying process 1302 and the network interface 1304 and acquiring their status according to an instruction from a control terminal 205 connected outside the unit and the data are stored.

The configuration of the selective packet copying process 1302 is the same as that of the selective packet copying process 202 in the first embodiment, however, in this embodiment, as the packet communications unit functions as a filter, no routing operation is performed. Therefore, no routing program and no data for routing exist in the packet communications unit 1202 and no packet is sent from the field of the selective packet copying process to a field of a routing process.

Figure 14:
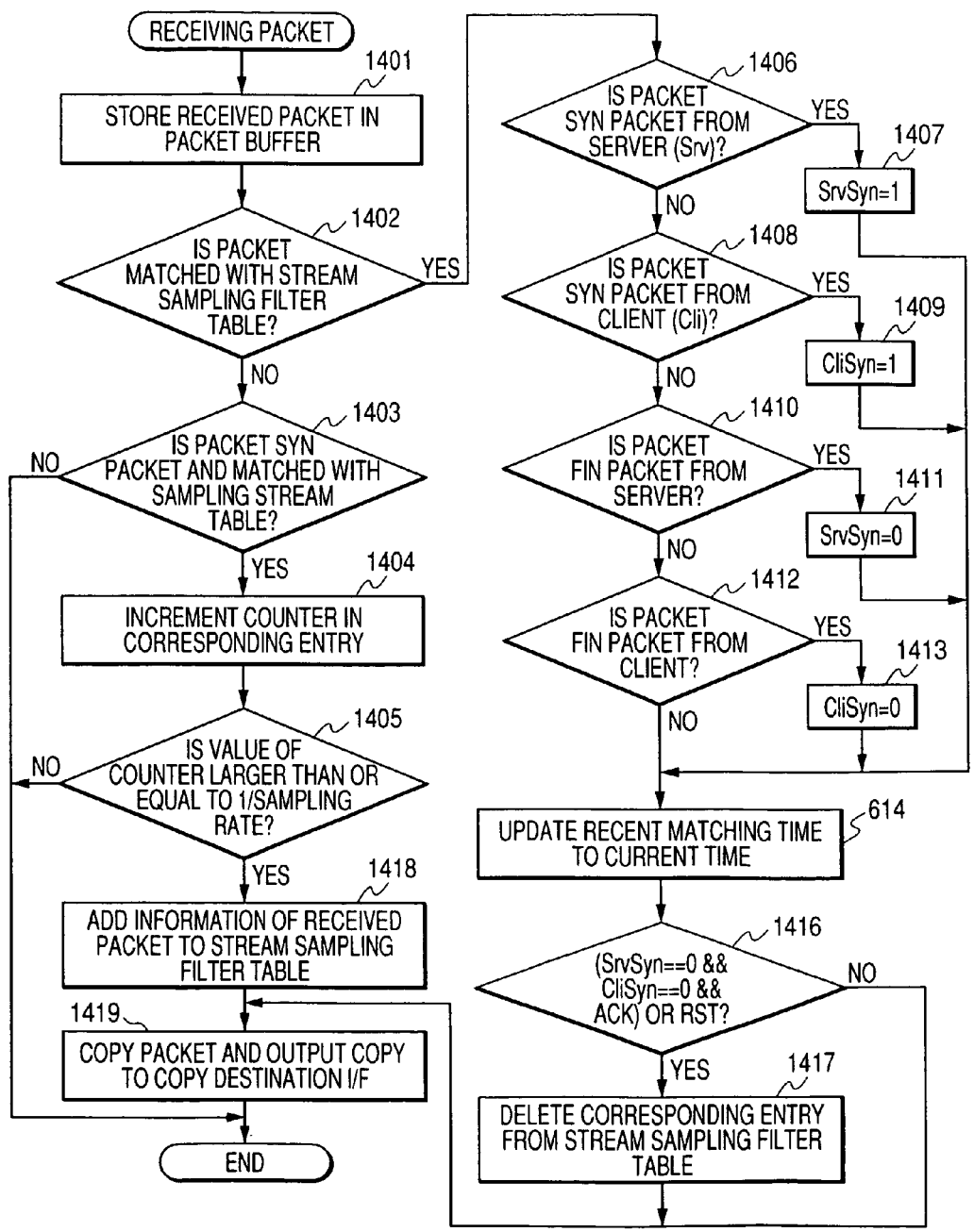
FIG. 14 is a flowchart showing a selective packet copying process by the packet communications unit in which the filter-type stream sampling function is implemented.

FIG. 14 shows the operation of the selective packet copying process 1202. The operation is different from that in the first embodiment only in that the operation has no step for transmitting a packet to a field of a routing process and a packet which is not an target of copying is merely ignored.

Fourth Embodiment

In the first, second and third embodiments, the examples that a packet copied by stream sampling is processed by each analyzing equipment located outside each packet communications unit are described. This embodiment describes a method of building a stream sampling function in a packet communications unit provided with an analyzing function.

Figure 15:
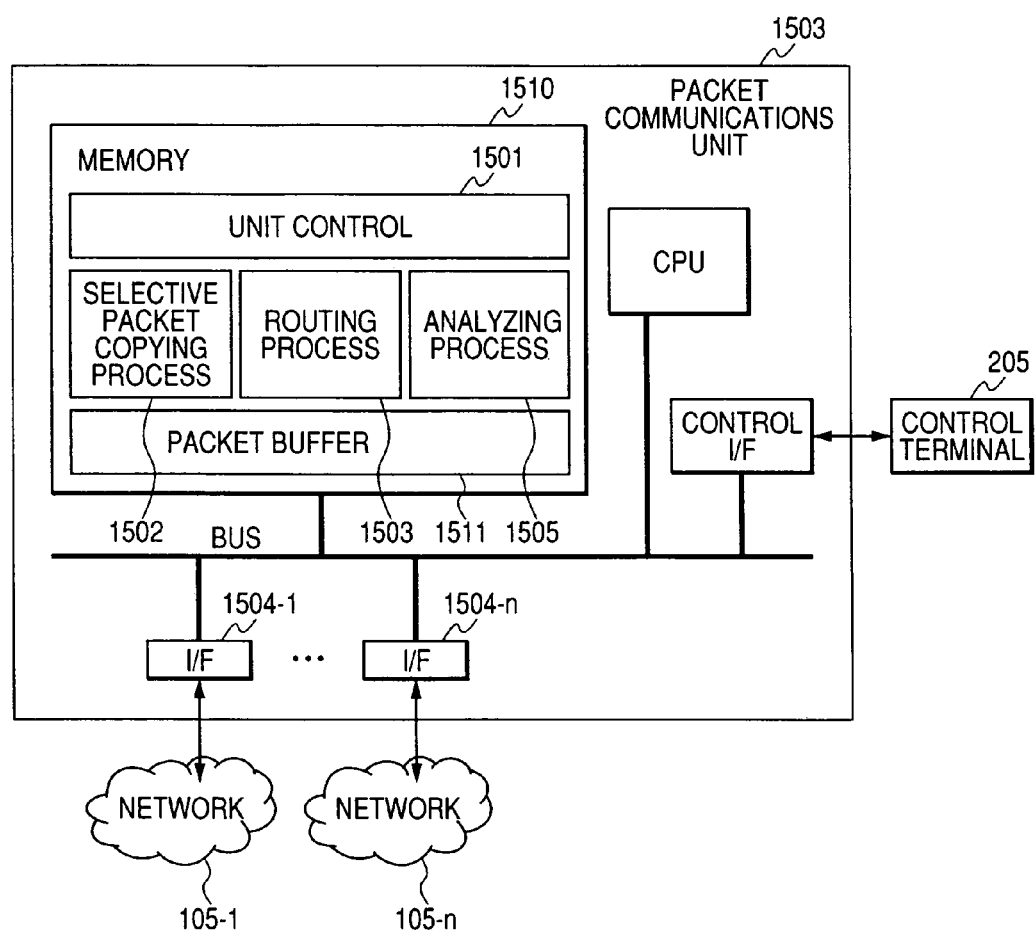
FIG. 15 is a block diagram showing a packet communications unit having an analyzing function.

FIG. 15 is a block diagram showing a packet communications unit 1503 provided with an analyzing function. The fourth embodiment is different from the first embodiment in that an analyzing program for an analyzing process 1505 and data are stored inside the packet communications unit 1503.

Figure 16:
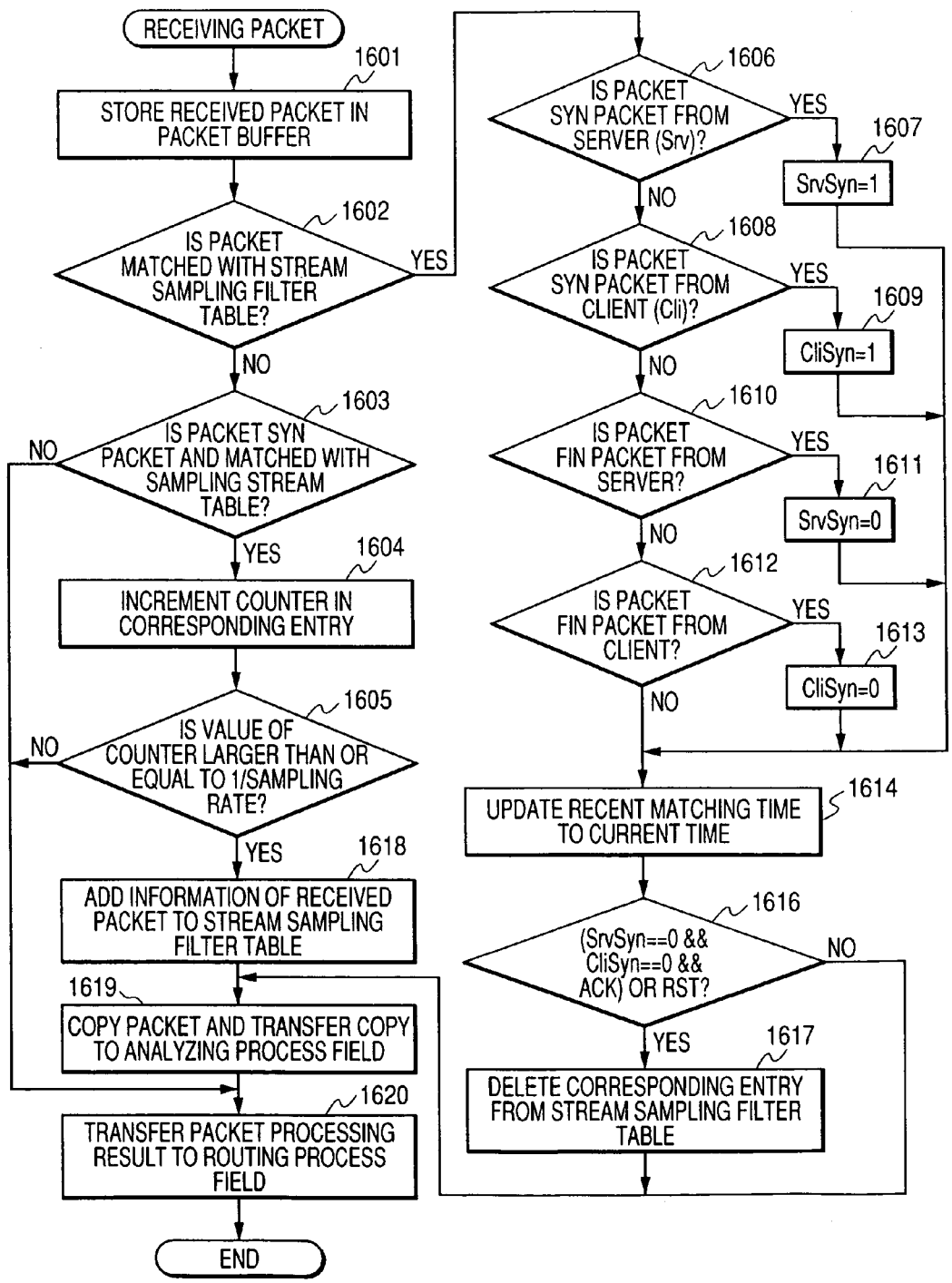
FIG. 16 is a flowchart showing a selective packet copying process by the packet communications unit having the analyzing function.

FIG. 16 shows a flow of the selective packet copying process 1502 in this embodiment. Differently from the first embodiment, in the selective packet copying process 1502 in this embodiment, a packet to be copied is transferred to a field of the analyzing process 1505 inside the packet communications unit 1503 in a step 1619.

A traffic analyzing system can be implemented in small space by building analyzing equipment in the packet communications unit as in this embodiment. In addition, an internal high-speed packet transfer mechanism can be utilized and a problem that a line between the packet communications unit and the analyzing equipment causes a bottleneck can be also solved. Therefore, an analyzing process on a higher-speed line can be implemented by the small-scale unit.

What is claimed is:

1. A packet communications unit, comprising:
a plurality of network interfaces, a selective packet copying unit, and a unit control unit for controlling the plurality of network interfaces and the selective packet copying unit;
a memory for holding a sampling rate of a stream to be sampled, a first stream sampling condition of the stream to be sampled in a corresponding entry of a first table, and a second stream sampling condition for identifying packets that comprise a sampling target stream in a corresponding entry of a second table, the first table including entries respectively having at least one value of a source IP address, a destination IP address, a source port number, a destination port number, and a protocol class, the second table including entries respectively having at least one of a server IP address, a client IP address, a server port number, a client port number, a protocol class, and a copy destination network interface identifier, wherein:
the selective packet copying unit executes a process comprising:
a step for specifying the first stream sampling condition in the corresponding entry of the first table and the sampling rate of the stream to be sampled;
a step for detecting a stream start packet according to a stream-oriented protocol from a packet received by the packet communications unit based on the respective at least one value of the entry corresponding to the first stream sampling condition of the stream to be sampled held in the first table;
a step for generating, based upon information in the stream start packet, the corresponding entry for the second stream sampling condition in the second table for identifying packets that comprise the sampling target stream for copying at the sampling rate; and
a step for generating a copy of the identified packets that comprise the sampling target stream identified based upon the second stream sampling condition and outputting the copy of the identified packets that comprise the sampling target stream via any of the plurality of network interfaces.

2. The packet communications unit according to claim 1, further comprising:
a program for adding an entry to the first table, deleting an entry from the first table and retrieving an entry in the first table, such that said selective packet copying unit is configured to execute the step for specifying the first stream sampling condition and the sampling rate of the stream to be sampled.

3. The packet communications unit according to claim 1, further comprising:
a program for adding an entry to the second table, deleting an entry from the second table and retrieving an entry in the second table.

4. The packet communications unit according to claim 1, wherein, in the step for detecting the stream start packet, the selective copying unit detects that an SYN flag is set in the packet received by the packet communications unit according to TCP.

5. The packet communications unit according to claim 1, wherein, in the step for detecting the stream start packet, the selective copying unit detects that the packet received by the packet communications unit according to SCTP includes an INIT chunk.

6. A packet communications unit according to claim 1, wherein the second stream sampling condition is generated based upon one of a source IP address, a destination IP address, a source port number, a destination port number and a protocol class respectively included in the stream start packet.

7. The packet communications unit according to claim 1, wherein the memory receives the identified packets that comprise the sampling target stream identified based upon the second stream sampling condition, and
wherein, when an RST flag is set in any identified packet that comprise the sampling target stream according to TCP is received via any of the plurality of network interfaces, the second stream sampling condition based upon which the identified packet having the RST flag set is identified is deleted from the memory after the identified packet having the RST flag set is copied.

8. A packet communications unit according to claim 1, wherein the memory receives the identified packets that comprise the sampling target stream identified based upon the second stream sampling condition, and
wherein, when a SHUTDOWN-COMPLETE chunk is included in any identified packet that comprises the sampling target stream according to SCTP is received via any of the plurality of network interfaces, the second stream sampling condition based upon which the identified packet that includes the SHUTDOWN-COM- PLETE chunk is identified is deleted from the memory after the identified packet that includes the SHUTDOWN-COMPLETE chunk is copied.

9. A packet communications unit according to claim 1, wherein a flag showing whether an SYN packet is received from a server that communicates a stream or not and a flag showing whether an SYN packet is received from a client or not can be stored in the memory, wherein, when an SYN packet is received from the server, a flag showing that the SYN packet is received from the server is set, wherein, when an SYN packet is received from the client, a flag showing that the SYN packet is received from the client is set, wherein, when an FIN packet is received from the server, the flag showing that the SYN packet is received from the server is cleared, wherein, when receives an FIN packet from the client, the flag showing that the SYN packet is received from the client is cleared, wherein the flag showing that the SYN packet is received from the server and the flag showing that the SYN packet is received from the client are both cleared, and wherein, when a TCP ACK packet matched with the second stream sampling condition for identifying the packets that comprise the sampling target stream is received, the second stream sampling condition is deleted.

10. The packet communications unit according to claim 1, wherein the memory is configured to hold a plurality of respective stream sampling conditions for identifying respective packets that comprise a plurality of corresponding sampling target streams in the second table, wherein a respective time for each of the plurality of respective stream sampling conditions indicating when the respective stream sampling condition is generated is stored in the memory, and wherein, when the plurality of respective stream sampling conditions stored in the memory exceeds a predetermined number of respective stream sampling conditions, the respective stream sampling condition having the least recent respective time is deleted from the memory.

11. The packet communications unit according to claim 1, wherein the memory is configured to hold a plurality of respective stream sampling conditions for identifying respective packets that comprise a plurality of corresponding sampling target streams in the second table, wherein respective time for each of the plurality of respective stream sampling conditions indicating when a respective most recent packet of the corresponding sampling stream for the respective stream sampling condition is stored in the memory, and wherein, when the plurality of respective stream sampling conditions stored in the memory exceeds a predetermined number of respective stream sampling conditions, the respective stream sampling condition having the least recent respective time is deleted from the memory.

* * * * *